United States Patent [19]
Lemberger et al.

[11] 3,724,664
[45] Apr. 3, 1973

[54] SEWAGE TREATMENT SYSTEM

[75] Inventors: Robert A. Lemberger, Vienna; Jerry L. Gilmore, Rolla, both of Mo.

[73] Assignee: Missouri Engineering Corporation, Rolla, Mo.

[22] Filed: Jan. 25, 1971

[21] Appl. No.: 109,233

[52] U.S. Cl. ................210/104, 210/138, 210/170, 210/532 S
[51] Int. Cl. ............................................B01d 21/24
[58] Field of Search....210/104, 152, 170, 532 S, 138

[56] References Cited

UNITED STATES PATENTS

| | | | |
|---|---|---|---|
| 3,306,447 | 2/1967 | Medeiros | 210/170 X |
| 3,025,962 | 3/1962 | Williams | 210/104 X |

*Primary Examiner*—John Adee
*Attorney*—Ralph W. Kalish

[57] ABSTRACT

A sewage treatment system especially adapted for residential usage comprising a below ground tank having a settlement chamber for receiving raw sewage, and an aeration chamber in communication therewith; there being a submersible pump within said aeration chamber, an above ground sprinkler, and a control valve connecting said sprinkler and said submersible pump. Said valve is of two position character; in one position, effluent is recirculated within said aeration chamber, and in said other position, effluent is discharged through said sprinkler for dispersion within the surrounding area; and means being provided for entraining air into effluent during recirculation. The operation of said control valve, together with said pump, is governed by timing means.

14 Claims, 9 Drawing Figures

INVENTORS
ROBERT A. LEMBERGER &
JERRY L. GILMORE

BY *Ralph W. Kalish*

ATTORNEY

INVENTORS
ROBERT A. LEMBERGER &
JERRY L. GILMORE

BY *Ralph W. Kalish*

ATTORNEY

INVENTORS
ROBERT A. LEMBERGER &
JERRY L. GILMORE

BY Ralph W. Kalish
ATTORNEY

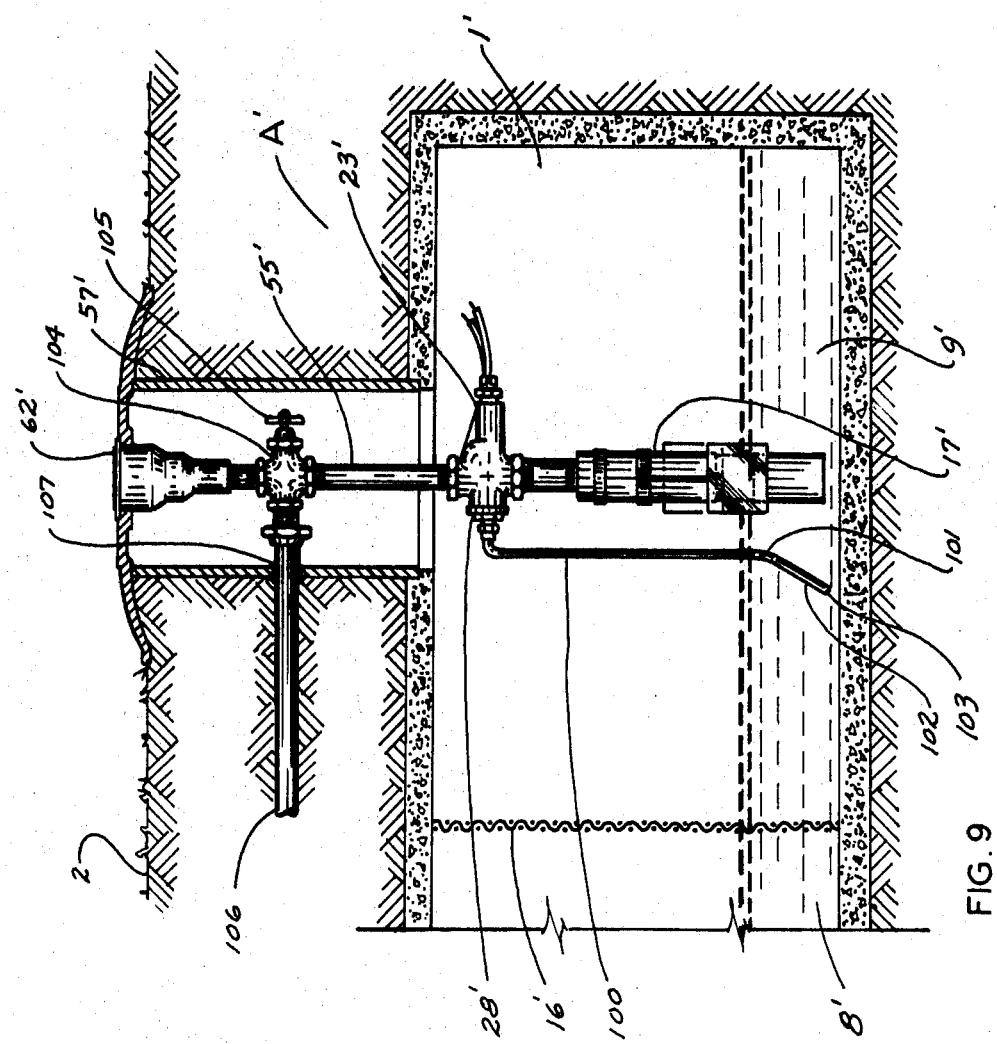

SEWAGE TREATMENT SYSTEM

BACKGROUND AND SUMMARY OF THE INVENTION

The present invention relates in general to sewage treatment and disposal and, more particularly, to a treatment system adapted especially for residential usage with the effluent being discharged to the atmosphere for dispersion over the adjacent ground area.

It is a primary object of the present invention to provide a treatment system which obviates the use of the conventional filter beds, tile fields, leach wells, and the like, and which is adapted for rendering accepted raw sewage innocuous so that the same may be discharged into adjacent ground area without untoward effect, but with beneficial watering and fertilizing of such area.

It is another object of the present invention to provide a sewage treatment system of the character stated which is adapted for automatic operation and incorporates means for periodically aerating the received sewage to neutralize any offensive matter, and means for effecting discharge to the atmosphere of such aerated effluent.

It is another object of the present invention to provide a sewage treatment system of the type stated which may incorporate timing means for effecting requisite periodic, sequential operation of the system so that the same does not require the intervention of human attention.

It is a further object of the present invention to provide a sewage treatment system of the type stated which is markedly compact, and comprised of a simplicity of durable components so that the same is particularly suited for individual residential or small commercial establishment usage; and which system is fully mechanical, being adapted for fascile removal for maintenance purposes.

It is a still further object of the present invention to provide a sewage treatment system of the type stated which uniquely integrates a below ground tank and an above ground sprinkler of conventional design for bringing about a novel and unusual, highly effective combination of basic components.

It is another object of the present invention to provide a sewage treatment system of the character stated which is most economical in operation; which is of marked efficacy with such reliable waste reduction that the effluent may be dispersed onto surrounding lawns, fairways, and the like, without causing the malodorous and unsanitary conditions heretofore long accepted as a result of utilizing systems incorporating septic tanks.

BRIEF DESCRIPTION OF THE DRAWINGS

FIG. 9 is a fragmentary elevational view in partial section of another form of sewage treatment system constructed in accordance with and embodying the present invention.

DESCRIPTION OF THE PREFERRED EMBODIMENT

Figure 1:
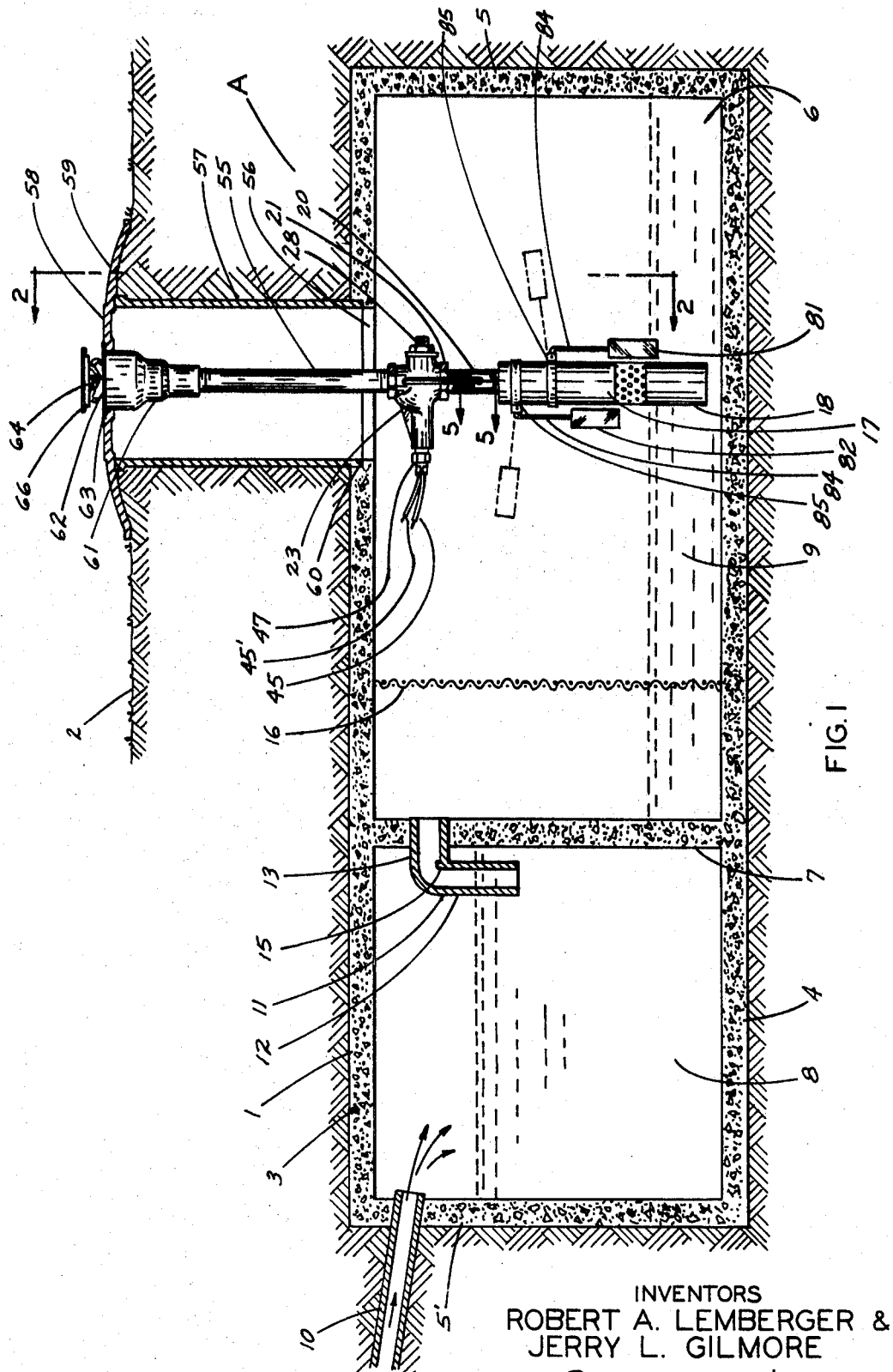
FIG. 1 is an elevational view in partial section of a sewage treatment system constructed in accordance with and embodying the present invention.

Referring now by reference characters to the drawings which illustrate the preferred embodiment of the present invention, A generally designates a sewage treatment system particularly designed for home or small commercial establishment usage comprising a tank 1 which may be of concrete and disposed below ground level, as indicated at 2. Said tank comprises a top wall 3, bottom wall 4, end walls 5,5', and side walls 6; there being a partition wall 7 dividing the interior of tank 1 into a settlement or septic chamber 8 and a relatively enlarged aeration chamber 9. Although the volumes of said chambers 8,9 may be preselected, it has been found that with chamber 8 having a capacity of approximately 450 gallons, and aeration chamber 9 having a volume adequate to receive 1050 gallons, this has proved most efficacious in actual operation. Settlement chamber 8 is connected to a source of raw sewage within the related building by a conduit 10 having its discharge end opening through the upper portion of end wall 5'. Fixed within partition wall 7, adjacent its upper end, is a pipe 11, as of elbow character, having a vertical leg 12 opening downwardly within chamber 8, and a horizontal leg 13 directed toward aeration chamber 9. Sewage flowing into chamber 8 will be subjected to settlement until the level thereof is such as to cause flow through pipe 11 and into aeration chamber 9. Within chamber 8 a sludge layer will develop on bottom wall 4 as solid waste precipitates, with bacteria conducing to breakdown of the sewage solids within said layer.

Presented in planar parallel relationship to partition wall 7, and relatively proximate same, is a filter screen 16 extending between top and bottom walls 3,4 and side walls 6 so that sewage effluent is subjected thereto and with the same tending to preclude passage of waste particles of commensurate size into the major portion of aeration chamber 9.

Figure 4:
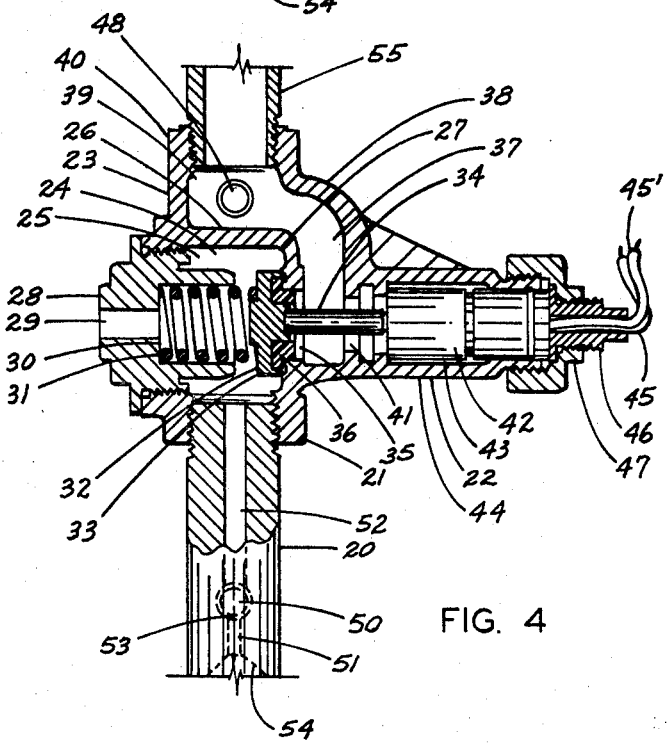
FIG. 4 is a vertical transverse sectional view taken substantially on the line 3—3 of FIG. 2 showing the valve in closed or effluent recirculation condition.
Figure 5:
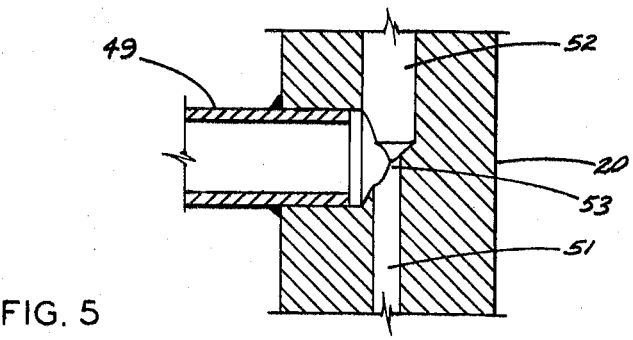
FIG. 5 is a vertical transverse sectional view taken on the line 5—5 of FIG. 1.

Disposed substantially centrally of the major portion of aeration chamber 9, that is, the portion being limited end wall 5 and screen 16, is a submersible pump 17 incorporating a motor 18 suitably connected to a convenient power source 19 (FIG. 5). The upper, or discharge, end of pump 17 communicates with a vertically extending pipe 20 which, at its upper end, is suitably engaged, as by threading, within a downwardly projecting collar 21 formed at the lower, inlet end of the body 22 of a control valve 23. Valve body 22 incorporates a chamber 24, communicating with its said inlet end, which opens outwardly, at 25, and is defined by a top wall 26 and inner end wall 27 extending from side to side of said valve body 22. Threadedly engaged within the open end of chamber 24 is a throttle cap 28 having a relatively narrow axial bore 29 defining a discharge passage and a counterbore 30 for developing a recess for receiving a compression spring 31 which, at its outer end, bears against the end face of said counterbore 30 and, at its inner end, bears against the end face 32 of a valve disc 33 carried upon the end of an actuating piston 34 which extends through an aperture 35 formed in inner end wall 27. The inner face of aperture 35 and the adjacent outer surface portion of end wall 27 constitutes the valve seat for valve disc 33 which, through the pressure of spring 31, is normally urged rearwardly into seated disposition for closure of aperture 35, as illustrated in FIG. 4. In this condition it will be seen that fluid passing through pipe 20 will flow into valve chamber 24, thence through counterbore 30, and bore 29 for discharge therefrom. Valve disc 33 embodies a resilient bushing 36 for assuring a leak-proof engagement within the valve seat.

Piston 34 extends across the lower portion of a passage 37 established between end wall 27 and top wall 26 and the adjacent outer wall of valve body 22; which passage 37 is continuous with the upper, discharge end 39 of valve body 22 which is defined by an internally threaded annular boss 40.

Figure 3:
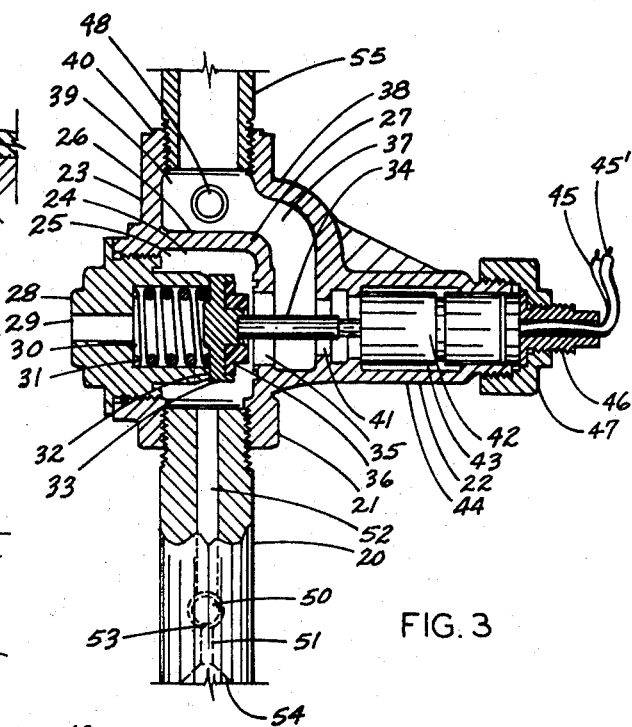
FIG. 3 is a vertical transverse sectional view taken on the line 3—3 of FIG. 2 showing the valve in open or sprinkler-communicating condition.

PIston 34 projects through an opening 41 formed in valve body wall 38 for connection to a thermal hydraulic motor 42 disposed in a compartment 43 provided within a cylindrical extension 44 at the inner or normally rearward end of valve body 22; said motor 42 being suitably connected, as by leads 45,45′, to power source 19. Leads 45,45′ are suitably led through the bore of an adjustment screw 46 engaged to an end cap 47 threaded upon the end extremity of extension 44. Said thermal hydraulic motor 42 is of the type disclosed in U.S. Pat. No. 3,376,631 incorporating an expansible and contractable hydrocarbon, such as paraffin or other wax as the motive material. Thus, no claim is made herein to the motor per se. It is understood that upon energization of the embodied heating element of motor 42, the hydrocarbon is caused to expand, forcing piston 34 in a direction toward spring 31 causing the same to be compressed (FIG. 3) so that valve disc 33 is brought into seated engagement upon the end surface of counterbore 30 for effecting opening of aperture 35 for establishing a flow path between the inlet and discharge ends of control valve 23 by way of passage 37. Upon de-energization of the heating element of thermal motor 42, the hydrocarbon will contract and piston 34 will be driven rearwardly through release of spring 31 causing valve disc 33 to be brought into seated disposition across aperture 35 and thereby block flow between the inlet and discharge ends of valve 23, as shown in FIG. 4.

Immediately below boss 40, valve body 22, on one side thereof, is provided with a port 48 for connection to the upper end of a by-pass tube 49, the lower end of which opens through a port 50 into the lower end of the bore 51 of pipe 20, which bore 51 is continuous with a counterbore 52 of relatively increased cross section, there being an intervening diverging portion 53, with a converging portion 54 at the lower end of said bore 51 whereby the latter is of venturi character for developing a pressure drop in the flow of sewage effluent moving therethrough from pump 17 for effecting entrainment of air from by-pass tube 49.

Figure 2:
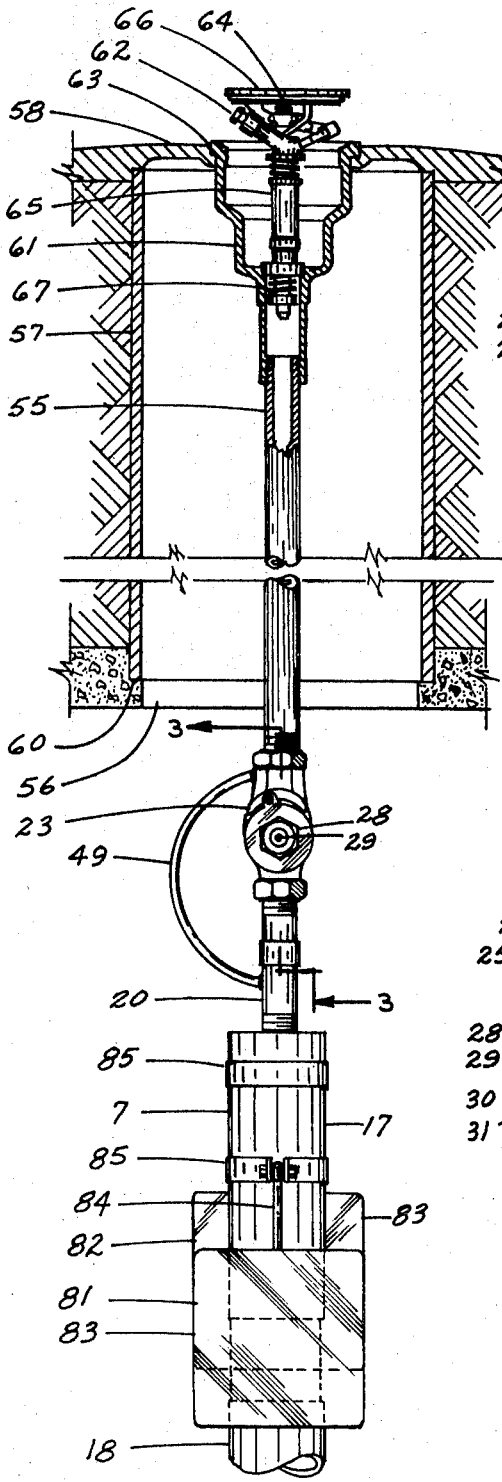
FIG. 2 is a vertical view in partial section taken on the line 2—2 of FIG. 1.

Threadedly engaged within boss 40 of control valve 23 is the lower end of a riser 55 which projects upwardly through an opening 56 formed in top wall 3 of tank 1 for extension co-axially of a casing 57 which extends upwardly through the intervening earth for termination at ground level; there being a cover plate 58 disposed across the upper end of said casing with marginal portions, as at 59, forming a snug seal with the adjacent ground portions. Casing 57 rests securely at its lower end upon a shoulder 60 developed in the face of opening 56. At its upper end, downwardly of cover plate 58, riser 55 is suitably connected to the housing 61 of a sprinkler 62 of the rotor pop-up type which is of well known character. Said housing 61, at its upper end, extends through an opening 63 formed centrally of cover plate 58 so that the customary nozzle arm 64 carried at the upper end of an axially, shiftable conduit 65 may be projected upwardly of ground level (as shown in FIGS. 1 and 2) for liquid dispersion. A top plate 66 is provided at the upper end of sprinkler unit 62 so that when the same is in inoperative position, tight closure is effected with cover plate 58. Top plate 66 is provided with a plurality of air vents so that when said sprinkler unit 62 is inoperative, air may be drawn downwardly through said vents, riser 55, and into by-pass tube 49 for sewage aeration, as will be described more fully below. As is characteristic of sprinklers of the type herein shown, the same is normally urged into closed condition as by a spring 67, but with the bias of said spring being overcome by pressure of liquid pumped through riser 55 for causing conduit 65 to shift upwardly to present nozzle arm 64 into spraying position and with the same having the customary rotative action during liquid ejection for dispersing liquid about the surrounding ground area.

Thus, in view of the foregoing, it will now be seen that when the thermal motor 42 of valve 23 is energized (FIG. 3), and with pump 17 operating, sewage effluent within aeration chamber 9 will be pumped through pipe 20 into passage 37 of valve 23, thence upwardly into riser 55 for overcoming the prejudice of spring 67 and thereby causing sprinkler 62 to be operative for dispersion of such effluent. Accordingly, with thermal motor 42 de-energized (FIG. 4), and with submersible pump 17 operating, the effluent will move through pipe 20 and into valve 23 for return to chamber 9 by discharge through bore 29; there being a recirculation by such valve condition. However, the flow of the pumped effluent through bore 31 of pipe 20 will cause air from the atmosphere to be drawn into the pumped effluent thereby providing aeration for such effluent which is returned to the chamber for continuous recirculation during the operation of pump 17 while valve 23 is in such condition. The drawing of air downwardly through riser 55 will cause any liquid therein to be removed therefrom thereby effectively denying any opportunity for liquid freezing within the riser 55 or within sprinkler unit 62.

Figure 8:
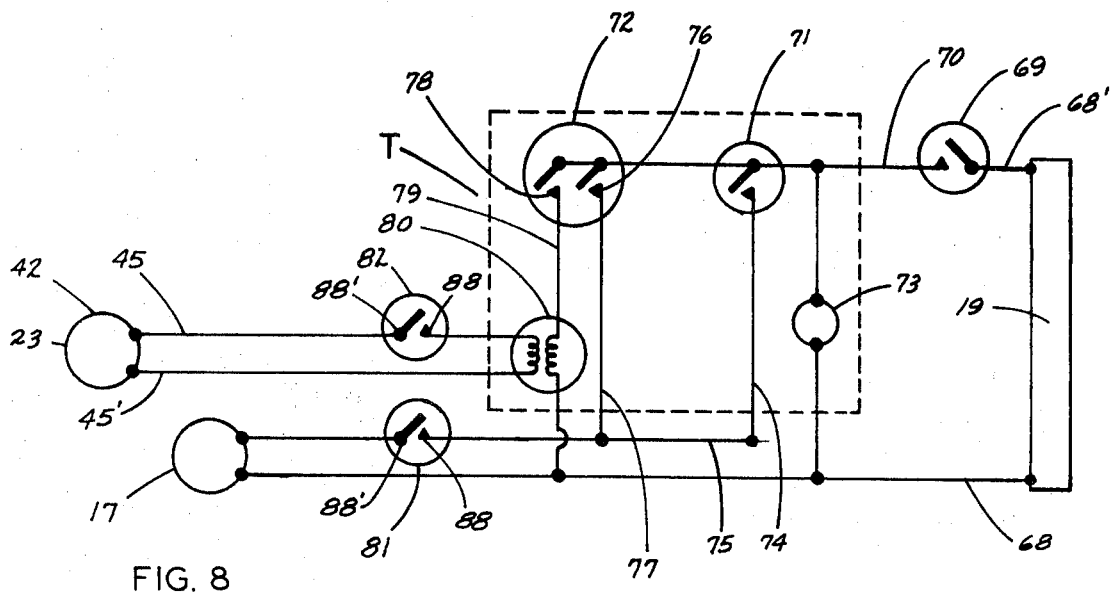
FIG. 8 is a wiring diagram.

By reference to FIG. 8 which presents a diagram of the circuit controlling the sequencing and relative periodicities of the operation of system A, the unique functioning of the present invention will become all the more apparent. Power source 19 is connected by a lead 68 to one side of submersible pump 17, and by a short lead 68′ to a master control switch 69. The other side of switch 69 is connected by a conductor 70 to a timer, indicated T, of conventional character wherein there are provided a single-pole and two-pole single-throw switches 71,72 connected in series by said conductor 70. Said timer T incorporates the usual time clock motor 73 which is connected across conductor 70 and main lead 68. The other side of single-pole switch 71 is in circuit by leads 74,75 with pump 17, while one contact, as indicated at 76, of two-pole switch 72 is connected to pump 17 through a conductor 77 and lead 75. The other, or second, contact 78 of two-pole switch 72 is connected by a conductor 79 to main lead 68, and with one side of a transformer 80, the other, or low, side of which is connected at its opposite ends to leads 45,45' which latter, as shown above, are connected to the opposite sides of thermal motor 42 of valve 23. Float-type safety switches 81,82 are provided within leads 75,45, respectively, to prevent operation of pump 17 and energization of thermal motor 42 below predetermined liquid levels within chamber 9. As will be described more fully hereinbelow, float switch 81 is adapted to cause operation of pump 17 at a liquid level below that at which switch 82 is closed so that subsequent to closure of switch 81, and prior to closure of switch 82, sewage effluent will be recirculated within aeration chamber 9, with concurrent air entrainment as above described since valve 23 will be in the condition shown in FIG. 4. With pump 17 operating, and subsequent to closure of float switch 82, sewage effluent will be pumped for dispersion by sprinkler unit 62 as valve 23 will then be in the condition shown in FIG. 3 with passage 37 opened and bore 29 closed.

By means of timer T, aerating recirculation of the sewage effluent and the dispersion of same by sprinkling may be effected at predetermined intervals during each day and for periods of selected duration. It will be seen that upon closure of single-pole switch 71 at a predetermined juncture by clock motor 73, the circuit to pump 17 will be closed to effect operation of the same subject, of course, to closure of float switch 81. Such pump operation will continue for the length of the preset interval, at the conclusion of which switch 71 will automatically open. Since two-pole switch 72 is in the opened state, thermal motor 42 remains de-energized so that the pumped sewage effluent merely follows the recirculating path above described to provide maximum interface with the entrained air for aerobic treatment of the effluent.

At another preselected point during the day, preferably shortly after midnight, motor time clock 73 will cause closure of two-pole switch 72 so that the circuit is simultaneously closed to pump 17 as through leads 77,75 and to thermal motor 42 via lead 79, transformer 80, and leads 45,45'; subject, understandably, to the closure of both safety switches 81,82. In this condition the pumped sewage effluent travels upwardly through passage 37 to sprinkler unit 62 for distribution about the surrounding area. Such sprinkler action continues for a preselected interval as controlled by time clock 73 or until the level of liquid within aeration chamber 9 causes opening of float switch 82.

Thus, in view of the foregoing, it will be seen that system A may be operated so that at prescribed times the liquid within chamber 9 will be subject to aeration and at another time discharged through sprinkler 62. Although the number of active periods in the course of a single day may be varied if desired, it has been found preferable that pump action for aeration be caused for two distinct periods and that thermal motor energization be caused for but a single period, as in the very early morning for effluent discharge. The system may be operated on 115 volts and with transformer 80 stepping the voltage down to 24 volts for energization of valve 23. A pump capacity of approximately 10 gallons per minute has been found both economical and effective so that in roughly a 50 minute period, chamber 9 can be reduced from full to substantially one-half full state which latter would constitute the normal operating level.

Figure 6:
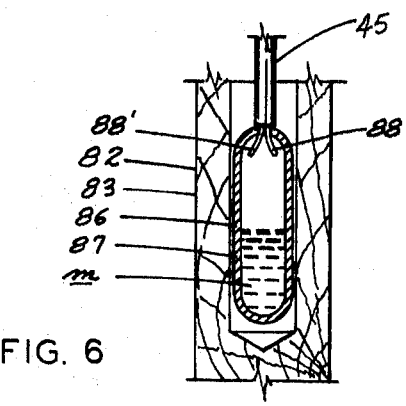
FIG. 6 is an elevational view of partial section of a float switch in open condition.
Figure 7:
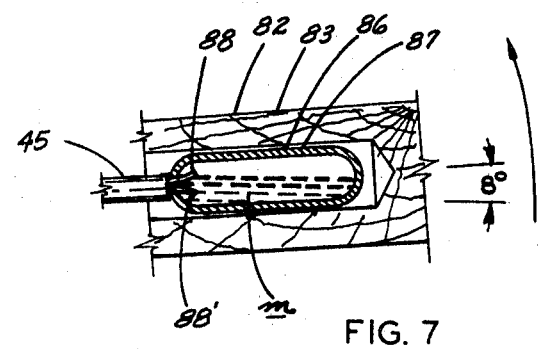
FIG. 7 is an elevational view in partial section of the float switch shown in FIG. 6 in closed condition.

With reference to FIGS. 1, 6 and 7, it will be seen that float switches 81,82 are of like construction in that each comprises a block body 83, preferably of wood, and being suspended by a chain or like flexible member 84 from a collar 85 mounted on pump 17. It will be seen that the collar of switch 82 is mounted a predetermined distance above that for switch 81 to provide for the operational differential which is dependent upon the liquid level in chamber 9. Disposed within each block 83 is a mercury switch 86 comprising a vessel 87 as of glass or other non-conductive material having a charge of mercury $m$. Said vessel 87 is of conventional design and may incorporate the customary partition, baffle, or the like (not shown) and having contact rods or terminals 88,88' so related that the same will be in switch-closed, or mercury immersed condition when the related block 83 is disposed at a relatively shallow angle above horizontal, such as in the order of 8 degrees, as suggested in FIG. 7. SAid terminals 88 are suitably connected to the components of the related lead 75,45, as the case may be, and which leads may be intertwined with the associated chain 84 and directed therefrom to suitable integration within the system circuit. It is, of course, obvious that switches 81,82 may be caused to effect circuit closure at any preselected angle to the horizontal by reason of the disposition of the same due to the liquid level. However, as indicated, an angle of approximately 8° above the horizontal passing through the point of chain attachment to the respective collar 85 has been found most effective.

It is manifest that if desired float switches 81,82 may be suspended by their respective leads 75,42 and thus obviate the necessity of a chain or like member. Block bodies 83 are so contoured that the same will at all times float with the major flat side upwardly and thus avoid the development of any twisting or other distortion which might be damaging to the associated, suspending lead 75,42 as the case may be. Block bodies 83 are suitably coated for water proofing purposes such as by a multi-layer of an epoxy-based material which is also used to encapsulate the associated switch 86. By utilizing leads for supporting switches 81,82 the same may be clamped directly to the motor without need for a hinge or pivot point.

Motor 18 of pump 17 operates at a relatively elevated temperature so as to effect a heat transfer to the liquid within chamber 9 providing a desired warming effect which promotes bacterial growth so that the purifying treatment of such liquid is markedly enhanced. Such temperature may approximate 67°F. This warming effect also causes water within the head of sprinkler unit 62 to be relatively warm during cold weather so that freezing of the unit is prevented and year around effective operation is assured.

The present invention does constitute an improvement over the widely used septic tanks since by reason of the aerating-recirculating procedure the system of the present invention can satisfy approximately 85 to 95 percent of the biological oxygen demand with almost total elimination of odor. Whereas the usual septic tanks can only meet about 30 percent of such demand and fail to bring about odor elimination.

The effluent sprayed by sprinkler unit 62 is of such pure state that the same may be used for surface irrigation without danger of pollution and allowing for the salutary effect of the fertilizing agents within such effluent such as phosphates, nitrates and other minerals.

Referring now to FIG. 9 which illustrates another form of the present invention, A' generally designates a sewage treatment system comprising a tank 1' with a septic chamber 8' and aeration chamber 9'; there being a screen 16' provided within said aeration chamber 9'; a pump 17', control valve 23', riser 55' and pop-up sprinkler 62', all of said components being structurally the same as the corresponding components of system A hereinabove described. However, in system A' control valve 23' is turned through an angle of 180° to control valve 23 of system A so that the related chamber 24' (not shown) is directed toward screen 16' (see FIG. 9). The associated throttle cap indicated 28' is connected to a discharge tube 100 which extends downwardly toward the base wall of aeration chamber 9' and proximate its lower extremity is bent as at 101 so that its lower end portion 102 is axially at an acute angle to the main portion of tube 100. The lower or discharging end 103 of tube 100 is disposed immediately above the base wall of said chamber 9'. It will be observed that end portion 102 extends in a direction toward screen 16' so that during the aeration or recirculation cycle liquid flowing from chamber 24' (not shown) will flow into chamber 9' in such a manner as to cause the force thereof to dislodge particles that may have become wedged in screen 16' thereby preventing clogging of the screen mesh. Also tube 100 assures that the aerated fluid is delivered to the base of the tank.

Located within riser 55' substantially intermediate the length of casing 57' is a two-way valve 104 which may be of the ball type and of conventional construction; and having a control handle 105; which latter is set forth for illustrative purposes only since valve 104 may be adapted for remote control by well-known expedients. Extending from valve 104 in axially normal relationship to riser 55' is a conduit 106 which projects through a suitable opening 107 in casing 57' for progression through the adjacent ground, beneath ground level 2. Said conduit 106 is adapted for a multiplicity of purposes, such as, for instance, effecting communication with a companion sprinkler unit such as 62', should sprinkling through an enlarged area be desired, or for direct discharge as into a stream, at a remote point. It may be also noted that conduit 106 could well serve to affect the pumping of the effluent for discharge at a point relatively elevated from that at which the system is located. Accordingly, conduit markedly enhances the versatility of the present invention but constitutes merely an optional feature. By appropriate manipulation of valve 104 flow through conduit 106 may be denied and thus permit of operation in the manner above described with discharge through the single sprinkler 62' only.

Having described our invention what we claim and desire to obtain by Letters Patent is:

1. A sewage treatment system comprising means defining a below-ground tank for receiving sewage, sewage effluent sprinkler means provided aboveground, a sewage pump provided within said tank and having a discharge end, first means interposed between said pump discharge end and said sprinkler means for communicating the one with the other, second means interposed between said pump discharge end and the interior of said tank for communicating the one with the other, and valve means disposed between said pump discharge end and said first and second interposed means.

2. A sewage treatment system as defined in claim 1 and further characterized by means dividing said tank into a settlement chamber and an aeration chamber, said pump being located within said aeration chamber of said tank.

3. A sewage treatment system as defined in claim 1 and further characterized by said valve means comprising a valve body having first and second compartments, said first compartment being located within said first interposed means, said second compartment being disposed within said said interposed means, a valve member provided within said valve body and operable between said first and second compartments for selectedly operatively connecting said pump with said sprinkler means or with the interior of the tank.

4. A sewage treatment system as defined in claim 3 and further characterized by a safety float switch, means operatively connecting said float switch to said pump to permit operation of the same at a preselected effluent level in said tank.

5. A sewage treatment system as defined in claim 4 and further characterized by a second safety float switch, means operatively connecting said second safety float switch to said valve means whereby the latter is operable at a predetermined effluent level above that of said other safety float switch.

6. A sewage treatment system as defined in claim 5 and further characterized by said safety float switch and said second safety float switch each comprising a float body, a mercury switch encased within said body, terminals provided within said mercury switch for circuit closing condition when the main axis of said float body is disposed at a predetermined angle to the horizontal.

7. A sewage treatment system as defined in claim 3 and further characterized by said sprinkler means comprising a sprinkler head disposable above ground level for effluent dispersion consequent to effluent pressure, first conduit means connecting said sprinkler head with said valve body second compartment, second conduit means connecting said pump and said first compartment of said valve body, means defining a by-pass tube extending between said second compartment of said valve body and said second conduit means for establishing air flow between the atmosphere and said second conduit means for entrainment of air into the effluent pumped into said first compartment of said valve body.

8. A sewage treatment system as defined in claim 7 and further characterized by said second conduit means having a pressure-reducing, constricted passage at the point of connection to said by-pass tube means for air suction purposes.

9. A sewage treatment system comprising means defining a below-ground tank for receiving sewage, sewage effluent sprinkler means provided above-ground, a pump provided within said tank, valve means connected to said pump, means interconnecting said valve means and said sprinkler means, said valve means comprising a valve body having first and second compartments, said first compartment communicating with said pump, said second compartment communicating with said sprinkler means, a valve member provided within said valve body and operable between said first and second compartments for selectedly operatively connecting said pump and said sprinkler means, said valve body having a discharge opening communicating with said first compartment to permit recirculating flow of effluent within said tank by movement through said first compartment and said discharge opening from said pump.

10. A sewage treatment system as defined in claim 9 and further characterized by means for entraining air within said effluent prior to its arrival at said first compartment.

11. A sewage treatment system as defined in claim 9 and further characterized by means for moving said valve member between a first position permitting communication between said first and second compartments and a second position preventing communication between said first and second compartments, and timing means causing said valve member to be moved into said first position at preselected intervals.

12. A sewage treatment system as defined in claim 11 and further characterized by said means for moving said valve member comprising a thermal hydraulic motor, a source of power, and circuit means connecting said source of power and said thermal hydraulic motor.

13. A sewage treatment system as defined in claim 11 and further characterized by said valve member being in said second position during recirculating flow of effluent within said tank.

14. A sewage treatment system comprising means defining a below-ground tank for receiving sewage, sewage effluent sprinkler means provided above-ground, a sewage pump provided within said tank and having a discharge end, first means interposed between said pump discharge end and said sprinkler means for communicating the one with the other, second means interposed between said pump discharge end and the interior of said tank for communicating the one with the other, a first valve means disposed between said pump discharge end and said first and second interposed means, a second valve means disposed between said sprinkler means and said first valve means within said second interposed means, said sprinkler means comprising a sprinkler head, and conduit-forming engaged to said second valve means located above said tank and between same and ground lever.

* * * * *